Aug. 29, 1967  B. C. CHOPELIN  3,338,262
SAFETY DEVICE FOR A CONSTANT-LEVEL FLOW REGULATOR
Filed Nov. 2, 1964  3 Sheets-Sheet 1

INVENTOR
BRUNO CHARLES CHOPELIN
ATTORNEY

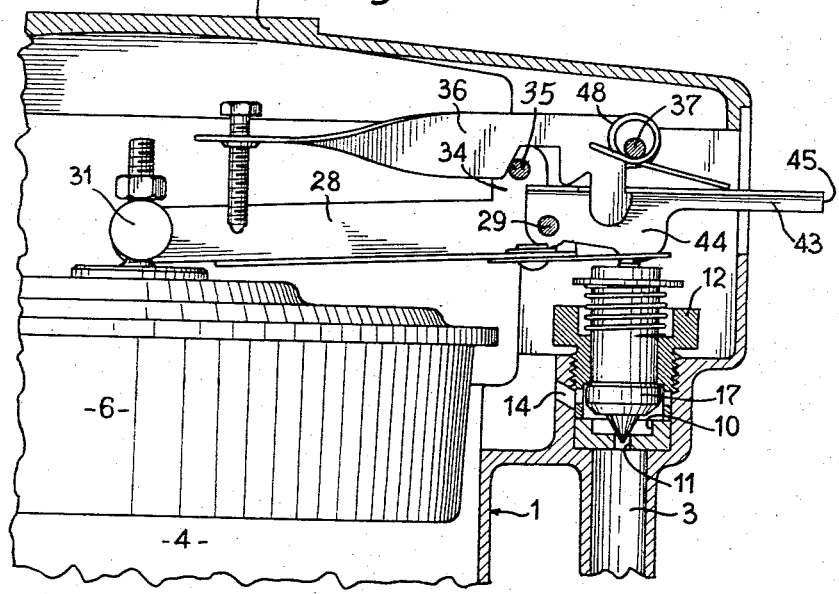
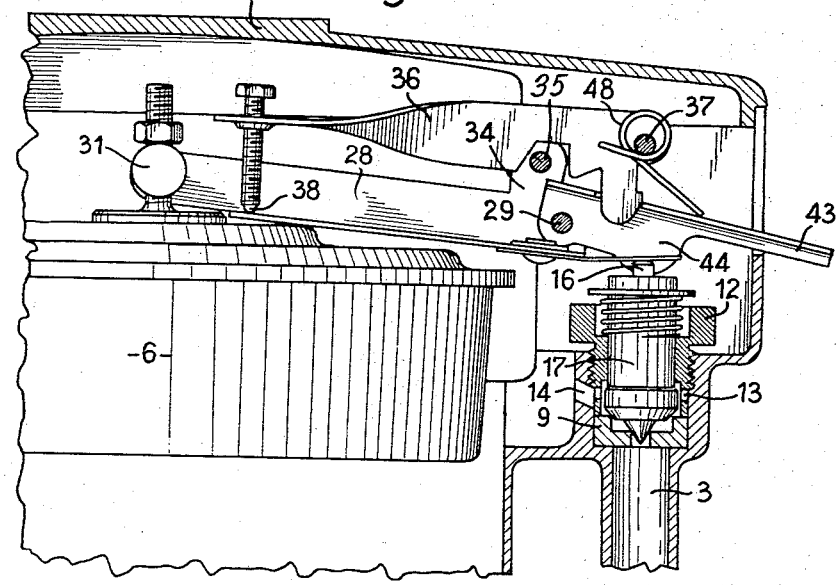

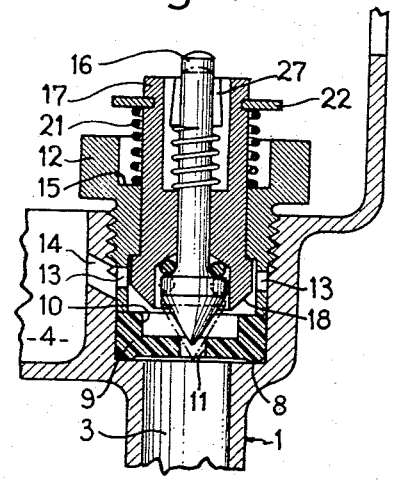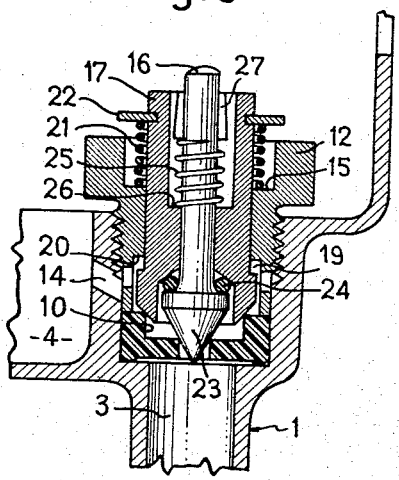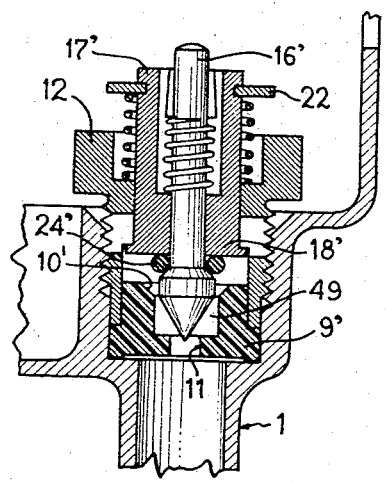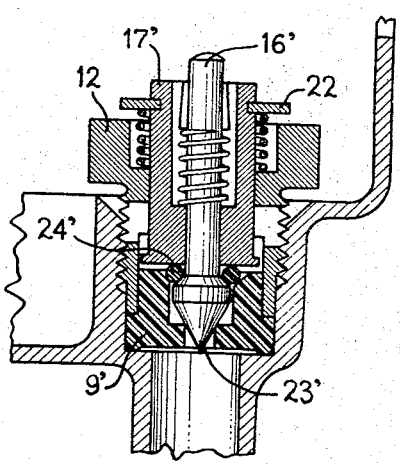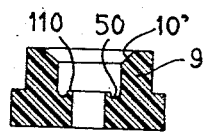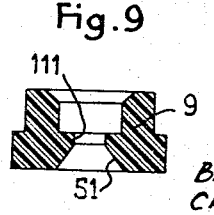

United States Patent Office 3,338,262
Patented Aug. 29, 1967

3,338,262
SAFETY DEVICE FOR A CONSTANT-LEVEL
FLOW REGULATOR
Bruno Charles Chopelin, Paris, France, assignor to Etablissements Henry Potez, Paris, France, a French body corporate
Filed Nov. 2, 1964, Ser. No. 408,200
Claims priority, application France, Nov. 5, 1963,
Patent 1,382,256
10 Claims. (Cl. 137—400)

ABSTRACT OF THE DISCLOSURE

Regulator comprising a chamber in which is disposed a float which controls a liquid supply needle valve through the medium of a pivotally mounted linkage device and applies it against an upstream valve seat when the float reaches a first level in the chamber. The needle valve is coaxially mounted in a second valve co-operating with a downstream valve seat. The second valve is controlled by a second linkage device and applied against its seat when the float reaches a second predetermined level.

---

The present invention relates in a general way to liquid flow regulators of the constant-level type.

Regulators of this type are employed for example in liquid fuel heating apparatus of the type in which the fuel flows by gravity into the float chamber from which the fuel is supplied to the burner where it is burnt, the level of the fuel in the float chamber remaining constant during consumption of the fuel.

These regulators comprise in the known manner a chamber in which is disposed a float which controls a liquid supply needle valve through the medium of a pivotally mounted lever.

One of the drawbacks of such a device resides in the fact that if the liquid to be supplied contains impurities or foreign bodies which could impair the operation of the needle valve, the latter no longer completely closes off the liquid supply and thus impairs the operation of the regulator.

Another drawback in these regulators is that if the hollow float deteriorates and loses its fluidtightness it becomes filled with liquid and can no longer insure the closure of the needle valve.

The object of the present invention is to provide a safety device for a regulator having a constant-level float chamber which remedies the aforementioned drawbacks, this device being reliable in operation and closing off the liquid supply to the float chamber when for some cause the level in the latter exceeds a predetermined height.

The safety device according to the invention comprises in combination in the liquid supply conduit a first needle valve and a second needle valve in concentric and coaxial relation to each other and movable relative to each other and respectively co-operating with two valve seats in series relation, a first linkage device actuated by the float for applying the first needle valve against the up-stream valve seat when the height of the liquid in the float chamber reaches a first predetermined level and a second linkage device actuated by the first linkage device for applying the second needle valve against the downstream valve seat when the height of the liquid in the float chamber reaches a second predetermined level.

According to another feature of the invention, the second linkage device comprises a first lever pivotally mounted on a fixed pivot pin and including at one end an abutment co-operating with the first linkage device and at its other end retaining means co-operating with a second lever, and elastically yieldable means interposed between the first lever and second lever urging the latter against the second needle valve when the second lever is released from the retaining means under the action of the first linkage device acting on said abutment when the height of the liquid in the float chamber raises the float above a predetermined level.

According to another feature of the invention, there is provided on the first linkage device a cam which co-operates with a ramp provided on the first lever of the second linkage device for releasing the second lever of the second linkage device and bringing it against the second needle valve when the float descends in the float chamber below a predetermined level.

Further features and advantages of the invention will be apparent from the ensuing description with reference to the accompanying drawings to which the invention is in no way limited.

In the drawings:

FIG. 2 is a vertical sectional view of the safety device in its "armed" position, the float being in its normal operational position;

FIG. 3 is a view similar to FIG. 2 in which the float is in a position above the aforementioned second level, the safety device being "disarmed" after having closed the second needle valve;

FIG. 4 is a vertical sectional view, on an enlarged scale, of the two concentric and coaxial needle valves in the open-valve position;

FIG. 5 is a view similar to FIG. 4 of the two needle valves in the closed-valve position;

Figure 1:
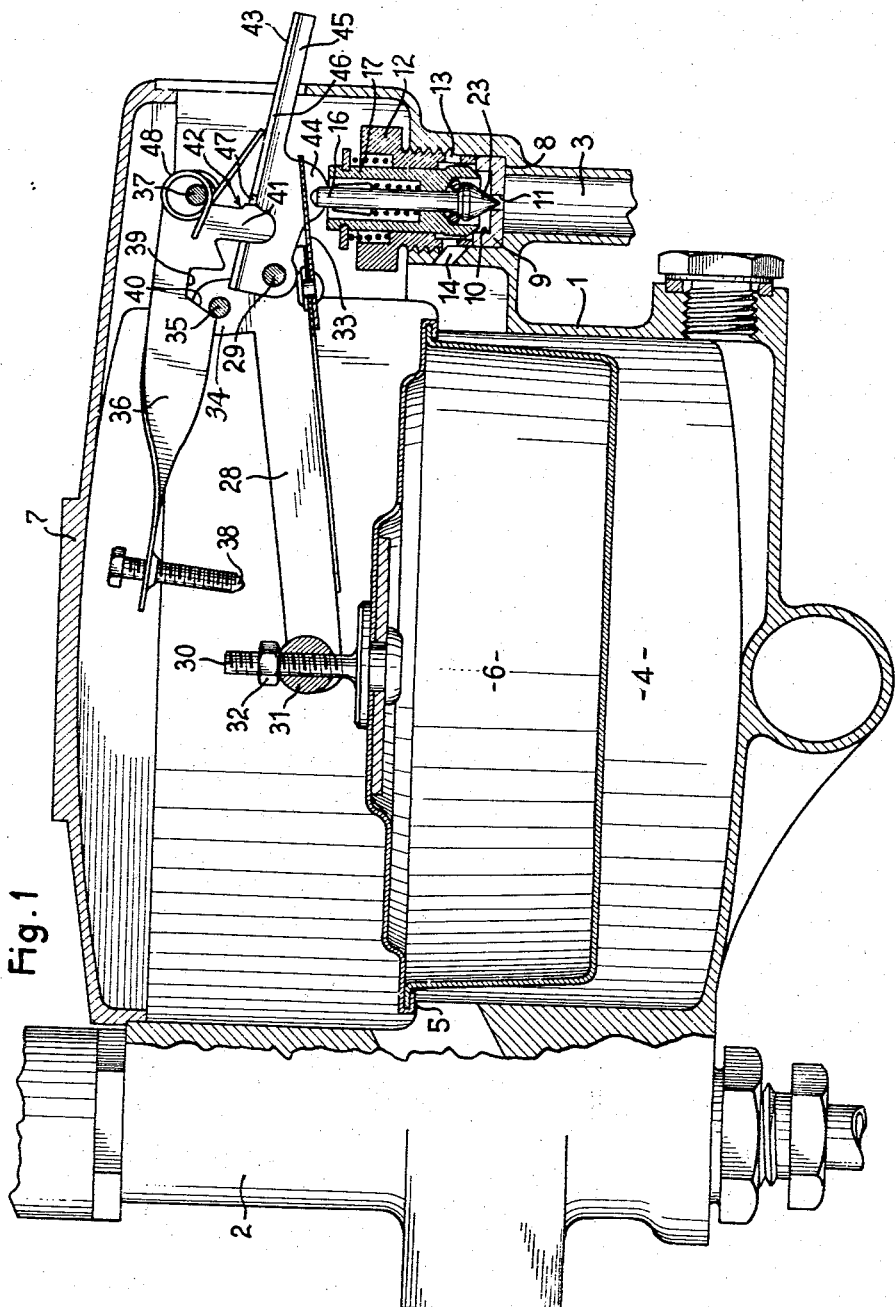
FIG. 1 is a partial vertical sectional view of a liquid flow regulator having a constant-level float chamber and a safety device according to the invention, the regulator being shown before the chamber has been filled.

FIGS. 6 and 7 are views similar to FIGS. 4 and 5 respectively of a variant of the second needle valve, and FIGS. 8 and 9 are vertical sectional views of two variants of the valve seats for the needle valves.

In the embodiment shown in FIG. 1, the constant-level flow regulator comprises, in the known manner, a body 1 having in integral relation an outlet conduit 2, a liquid supply conduit or well 3, a float-chamber 4 having an inner shoulder 5, a float 6 and a cover 7.

The well 3 has at its upper part an inner shoulder 8 supporting a valve seat structure 9 which is of shiftable elastic material, for example "nylon" and has a vertical flange 10 and a central aperture 11.

The upper end of the well 3 is tapped and receives a screwthreaded sleeve 12 which holds the valve seat structure 9 against the shoulder 8. The sleeve 12, which is more clearly seen in FIGS. 4 and 5, has at its lower end ports such as 13 which put the chamber 4 in communication with the well 3 by way of the passage 14.

At its upper part the sleeve 12 has an annular flange defining a recess constituting an inner shoulder 15 (FIG. 4) with the axial bore of the sleeve. A cylindrical needle valve 17 is fitted in this bore and includes an axial aperture and terminates at its lower end in a generally frustoconical enlarged annular head 18 defining an outer shoulder 19 which constitutes an abutment which cooperates with a corresponding inner shoulder 20 (FIG. 5) formed in the bore of the sleeve 12.

The upper end of the needle valve 17 is surrounded by a coil spring 21 which bears at one end against the shoulder 15 and at the other end against a split ring 22 disposed in a groove in the upper end of the needle valve 17 (FIG. 4) and biases the latter upwardly so as to maintain the annular head 18 upwardly spaced from the edge 10 of the valve seat structure 9.

Another needle valve 16, constituted by a cylindrical rod and terminating at its lower end in an enlarged conical head 23, is fitted in the axial aperture of the needle valve 17. An elastically yieldable sealing ring 24 (FIG. 5) surrounding the stem of the needle valve 16 is disposed at the rear of the head 23 between the latter and the transverse end wall of the inner recess in the needle valve 17 defined by the annular head 18. Further, a spring 25 surrounds the stem of the needle valve 16 at the upper part thereof and bears at one end against an inner shoulder 26 formed in the axial aperture of the needle valve 17 and at the other end against an abutment 27 formed on the upper end of the needle valve 16 so as to bias the latter upwardly and hold the conical head 23 vertically spaced from the valve seat structure 9.

The fit between the needle valve 17 and the sleeve 12 and the fit between the needle valve 16 and the needle valve 17 are such that these elements are axially slidable relative to each other without excessive clearance so as to preclude passage of the liquid therethrough.

Further, the spring 25 upwardly biasing the needle valve 16 is so designed that its force is less than that exerted by the spring 21 upwardly biasing the needle valve 17. Thus, the arrangement is such that when pressure is exerted on the top end of the stem of the needle valve 16, the head 23 of the latter is made to bear against the valve seat structure 9, its bottom end entering the central aperture 11 of this structure while the needle valve 17 remains stationary.

On the other hand, if a pressure is exerted solely on the upper end of the needle valve 17 the latter slides in the sleeve 12 and the periphery of the head 18 bears against the flange 10 of the valve seat structure 9.

The head 23 of the needle valve 16 is also moved downwardly by the needle valve 17 through the medium of the ring 24 (FIG. 5).

Owing to the action of the two springs 21 and 25 the two needle valves 16 and 17 are held away from the valve seat structure 9.

The latter has two operative parts namely the central aperture 11 whose periphery constitutes a first valve seat, or "upstream" valve seat, co-operating with the head 23 of the needle valve 16 and the vertical flange 10 whose inner periphery constitutes a second valve seat or "downstream" valve seat co-operating with the head 18 of the needle valve 17. These two valve seats are thus connected to each other in series relation.

The needle valve 16 which can be actuated alone, is controlled by a first linkage device comprising a lever 28 (FIGS. 1–3) which has an L-shaped cross-section and is pivotally mounted at one end on a fixed pivot pin 29 rigid with the body 1 and pivoted at the other end to the center of the top of the float 6. The last-mentioned pivotal connection is advantageously composed of a screw-threaded rod 30 rigid with the float and extending through a ring or other means 31 which is pivotally mounted on the end of the lever 28 and retained on the rod 30 by a nut 32. This arrangement enables the up and down movements of the lever 28 to be adjusted.

The lever 28 is extended, adjacent the end thereof pivoted to the pin 29, by a blade spring 33 which for example is secured by a rivet to the bottom flange or branch of the L-section and extends to a position above the needle valve 16, the arrangement being such that any upward displacement of the float 6 above a predetermined level in the float-chamber exerts an elastically yieldable pressure on the needle valve 16 and thus closes off the supply of liquid to this chamber.

The lever 28 further comprises in the vicinity of the pin 29 a tab 34 which extends from the lateral flange of the L-section and carries a pin 35 which constitutes a cam fixed pependicularly to the tab 34, this cam 35 co-operating with a ramp provided on another lever pertaining to a second linkage device which will now be described and is adapted to actuate the second needle valve 17.

This second linkage device comprises a first lever 36 which is pivotally mounted at one end on a fixed pin 37 rigid with the body 1 and extends above the lever 28 in a direction parallel to the latter.

The lever 36 comprises, at the end thereof opposed to the pin 37, an adjustable abutment 38, advantageously constituted by a screw extending downwardly toward the top of the float, and a notch 39 including an inclined ramp 40 which is located in the vicinity of the pin 37 and adapted to co-operate with the cam 35 carried by the lever 28 of the first lever device.

The lever 36 further comprises at the end thereof mounted on the pin 37 a retaining device constituted by a tab 41 which includes a nose 42 and depends from the pin 37.

The retaining device 41, 42 co-operates with the second lever 43 which is pivotally mounted at one end on a pivot pin 29.

The lever 43 is formed by a metal bar having an enlarged portion 44 extended by a narrow portion 45 and throughout its length a flange 46 extending at right angles to the rest of the lever 43. The lever 43 extends from the pin 29 under the lever 36 and in the opposite direction relative to the latter and to the lever 28. The narrow portion 45 extends out of the body 1 through an opening in the latter.

The flange 46 includes a recess 47 in which the tab 41 extends in a direction parallel to the enlarged portion 44 of the lever 43 and there is provided a spring 48 disposed around the pin 37 and having one end secured to the lever 36 in an aperture in the latter and its other end bearing against the lever 43. The arrangement is such that the sping 48 biases the enlarged portion 44 of the lever 43 against the edge of the top end of the needle valve 17 so as to urge the head of the latter against the downstream valve seat and consequently the head of the needle valve 16 against the upstream valve seat in opposition to the action of the spring 21, further the nose 42 of the retaining device is capable of encountering the edge of the recess 47 of the lever 43 and maintaining the latter in the upper position, in opposition to the action of the spring 48, so as to hold the enlarged portion 44, away from the top of the needle valve 17.

It will be understood that in such an arrangement, the levers 36 and 43 in combination with the spring 48 constitute a release device, the lever 43 being suddenly released from the retaining nose 42 and urged with force against the needle valve 17 under the action of the spring 48 when the lever 36 is raised.

The safety device according to the invention operates in the following manner:

With a float chamber 4 empty, the float 6 rests by a peripheral flange on the shoulder 5 and the two needle valves 16 and 17 are held against their respective seats under the action of the spring 48 which applies the enlarged portion 44 of the lever 43 against the top of the needle valve 17 in opposition to the action of the spring 21.

To fill the chamber 4, the end 45 of the lever 43 is raised and is maintained in a horizontal position in opposition to the action of the spring 48. This releases the needle valve 17 which is raised off its valve seat by the action of the spring 21, the needle valve 16 also being raised under the action of its spring and thus allowing the liquid to flow in the chamber 4.

When the float 6, is being raised by the liquid, it shifts the lever 28, the lever 36 is moved downwardly by the spring 48, the pin 35 in moving in clockwise direction around the pivot pin 29, allowing the ramp 40 to slide downwardly against it.

At this movement, the nose 42 of the retaining device comes into engagement with one of the edges of the recess 47 of the lever 43 and thus maintains the latter in the upper position out of contact with the needle valve 17. The float has then reached a first predetermined position (FIG. 2). The retaining device is then "armed," the blade spring 33 extending the lever 28 being in contact with the needle valve 16 and applying the head 23 of the latter against the upstream valve seat 11 to close off the liquid supply.

For a given liquid flow, the level of the liquid in the float chamber is established at a certain height which is substantially constant for the considered flow. Any variation in the level results in a variation in the level of the float and corresponds to an immediate correction by the blade spring 33 of the needle valve 16 and consequently of the inlet of the liquid, which represents the normal operation of the regulator.

In the event that a foreign body interferes with the closure of the needle valve 16 against its valve seat 12, the level of the liquid continues to rise in the float chamber and raises the float 6 and lever 28. The blade spring 33 is then deformed and the pressure it exerts on the needle valve 16 is increased. In some cases, this increased pressure would be sufficient to expel the foreign body and thus close off the liquid supply. However, if this increased pressure is insufficient, the level of the liquid continues to rise in the chamber until the instant when the float reaches a second predetermined position in which the end of the screw 38 forming an abutment comes in contact with the edge of the lever 28 (FIG. 3). A further increase in the level of the liquid in the chamber thereafter upwardly moves the lever 36 which is rigid with the abutment 38 and this immediately releases the retaining nose 42 from the recess 47 of the lever 43. The latter consequently sharply moves downwardly under the effect of the spring 48 and the enlarged portion 44 strikes against the needle valve 17 whose head 18 is applied against the downstream valve seat 10 and thus closes off the liquid supply.

It will be observed that when the needle valve 17 is applied against the downstream valve seat, it transmits to the needle valve 16 the sudden impact of the lever 43 through the medium of the elastically yieldable ring 24 surrounding the head of the needle valve 16. The safety device is thus "disarmed" and in order to put the regulator back in service, it is sufficient to once more raise the end of the lever 43 after having emptied the float chamber and cleaned the needle valves.

If, owing to a defect in the sealing, the float 6 becomes filled with liquid and thus becomes completely immersed in the liquid in the float chamber and its periphery flange bears against the shoulder 5, it moves the lever 28 downwardly. The pin 35 then describes an arc of a circle having as centre the centre of the pin 29 and, in the course of this movement, comes in contact with the inclined ramp 40 and acts on the latter in such manner as to raise the lever 36 which consequently releases the lever 43 of the retaining device 42 in the manner described hereinbefore and applies the needle valve 17 against its valve seat and closes off the liquid supply.

In the variant shown in FIGS. 6 and 7, the valve seat structure 9' comprises a central recess 49 in which the head 23' of the needle valve 16' can enter with clearance. The downstream valve seat 10' is countersunk or chamfered, as can be seen more clearly in FIG. 6, so as to partially receive the sealing ring 24'. Further, the needle valve 17 of the previously-described embodiment is replaced by a cylindrical element 17' which is of similar shape but has at its bottom end a flat surface.

In this variant, the liquid supply is closed off, on the one hand, by the needle valve 16' bearing against the upstream valve seat 11 and, on the other hand, by means of the sealing ring 24' which is clamped between the flat end face of the element 17' and the chamfered part of the downstream valve seat 10', a certain pressure being transmitted to the head 23' of the needle valve 16'.

The valve seat structure 9 can have various shapes whereby it possesses a more or less pronounced elasticity. FIGS. 8 and 9 show two embodiments of the valve seat structure 9 by way of example. In these embodiments, the upstream valve seat is so shaped as to elastically grip the head of the needle valve 16, bearing in mind the elasticity of the material of which the valve seat structure 9 is composed (nylon), the gripping force increasing with the pressure of application of the needle valve. For this purpose, the operative part of the valve seat 11 is thinned down in some manner. In the embodiment shown in FIG. 8, an annular recess 50 is provided around the upper periphery of the seat 110 so as to form a relatively thin vertical ledge which is consequently more elastic. In the embodiment shown in FIG. 9 the lower part of the central aperture of the valve seat structure is downwardly flared at 51 and the valve seat 111 is constituted by a relatively thin portion of material.

It will be understood from the foregoing description that the safety device according to the invention is simple and reliable in operation in every case, owing to the provision of its needle valve system affording a double closure and to the linkage devices whose adjustable elements 32, 38 permit furthermore predetermining the critical levels of the liquid in the float chamber.

Although specific embodiments of the invention have been described, many modifications and changes may be made therein without departing from the scope of the invention as defined in the appended claims.

Having now described my invention, what I claim as new and desire to secure by Letters Patent is:

1. A safety device for a liquid flow regulator of the type having a body, a constant-level float chamber in the body, a float movable in the float chamber and a liquid supply conduit communicating with the chamber, said device comprising in combination, a first needle valve and a second needle valve in concentric co-axial and axially movable relation to each other, two valve seats inserted in series relation in the liquid supply conduit, one of said valve seats being an upstream valve seat and the other of the valve seats being a downstream valve seat relative to the direction of flow of the liquid toward the float chamber, the first needle valve and second needle valve respectively coacting with the upstream and downstream valve seats, a first linkage device operatively connected to the float and to the first needle valve for applying the first needle valve against the upstream valve seat when the liquid in the float chamber reaches a predetermined first level, and a second linkage device operatively connected to the first linkage device and to the second needle valve for applying the second needle valve against the downstream valve seat when the liquid in the float chamber reaches a predetermined second level.

2. A safety device for a liquid flow regulator of the type having a body, a constant level float chamber in the body, a float movable in the float chamber and a liquid supply conduit communicating with the chamber, said device comprising in combination a first needle valve and a second needle valve in concentric co-axial and axially movable relation to each other, two valve seats inserted in series relation in the liquid supply conduit, one of said valve seats being an upstream valve seat and the other of the valve seats being a down stream valve seat relative to the direction of flow of the liquid towards the float chamber, the first needle valve and second needle valve respectively coacting with the upstream and downstream valve seats, a first linkage device operatively connected to the float and to the first needle valve for applying the first needle valve against the upstream valve seat when the liquid in the float chamber reaches a predetermined first level, and a second linkage device operatively connected to the first linkage device and to the second needle valve for applying the second needle valve against the downstream valve seat when the liquid in the float chamber reaches a predetermined second level, the second linkage device comprising a first lever pivotably mounted on the body and having at one end an abutment coacting with the first linkage device and at the other end retaining means, a pivotably mounted second lever coacting with the retaining means, elastically yieldable means interposed between the first lever and second lever for urging the second lever against the second needle valve when the second lever is released from the retaining means under the action of the first linkage device which acts on the abutment when the level of the liquid in the float chamber raises the float above a predetermined level.

3. A safety device as claimed in claim 2, comprising a cam on the first linkage device and a ramp on the first lever of the second linkage device, the cam and ramp coacting for releasing the second lever of the second linkage device so that it is urged against the second needle valve when the float moves downwardly in the float chamber below a predetermined level.

4. A safety device as claimed in claim 3, wherein the first linkage device comprises a lever and a blade spring mounted on the latter, and engageable with the first needle valve, whereby the lever of the first linkage device acts on the first needle valve elastically.

5. A safety device as claimed in claim 1, wherein the upstream valve seat and downstream valve seat are formed on a single block of elastically yieldable material.

6. A safety device for a liquid flow regulator of the type having a body, a constant-level float chamber in the body, a float movable in the float chamber and a liquid supply conduit communicating with the chamber, said device comprising in combination, a first needle valve and a second needle valve in concentric co-axial and axially movable relation to each other, two valve seats inserted in series relation in the liquid supply conduit, one of said valve seats being an upstream valve seat and the other of the valve seats being a downstream valve seat relative to the direction of flow of the liquid toward the float chamber, the first needle valve and second needle valve respectively coacting with the upstream and downstream valve seats, a first linkage device operatively connected to the float and to the first needle valve for applying the first needle valve against the upstream valve seat when the liquid in the float chamber reaches a predetermined first level, and a second linkage device operatively connected to the first linkage device and to the second needle valve for applying the second needle valve against the downstream valve seat when the liquid in the float chamber reaches a predetermined second level, the first needle valve being slidably mounted in the second needle valve, the latter having a head in the form of a hollow truncated cone, the first needle valve having a head which the truncated cone concentrically surrounds 7. A safety device as claimed in claim 6, further comprising an elastically yieldable sealing ring surrounding the first needle valve at the rear of the head of the first needle valve and bearing against the hollow head of the second needle valve.

8. A safety device for a liquid flow regulator of the type having a body, a constant-level float chamber in the body, a float movable in the float chamber and a liquid supply conduit communicating with the chamber, said device comprising in combination, a first needle valve and a second valve in concentric coaxial and axially movable relation to each other, two valve seats inserted in series relation in the liquid supply conduit, one of said valve seats being an upstream valve seat and the other of the valve seats being a downstream valve seat relative to the direction of flow of the liquid toward the float chamber, the first needle valve and second valve respectively coacting with the upstream and downstream valve seats, a first linkage device operatively connected to the float and to the first needle valve for applying the first needle valve against the upstream valve seat when the liquid in the float chamber reaches a predetermined first level, and a second linkage device operatively connected to the first linkage device and to the second valve for applying the second valve against the downstream seat when the liquid in the float chamber reaches a predetermined second level, the second valve being a cylindrical element having a plane transverse end face, the device further comprising an elastically yieldable sealing ring disposed around the first needle valve between the head of the first needle valve and said plane end face thereby providing a seal between the downstream valve seat and the plane end face when the second linkage device is actuated.

9. A safety device as claimed in claim 1, wherein the second linkage device constitutes a release system capable of being placed selectively in an "armed" inactive position and a "disarmed" active position in which it acts on the needle valves to close said valves against the valve seats.

10. A safety device as claimed in claim 9, wherein the second linkage device is adapted to move sharply from the armed position to the disarmed position under the action of the first linkage device and of a spring actuated by the float when the latter has moved beyond either of two predetermined levels one of which is an upper level and the other a lower level of the float.

References Cited

UNITED STATES PATENTS

| | | | |
|---|---|---|---|
| 2,304,444 | 12/1942 | De Lancey | 137—400 |
| 2,338,319 | 1/1944 | De Lancey | 137—411 |
| 2,866,477 | 12/1958 | Bredtschneider et al. | 137—614.18 X |

WILLIAM F. O'DEA, *Primary Examiner.*

D. R. MATTHEWS, *Assistant Examiner.*